United States Patent [19]
Laurent

[11] 3,982,397
[45] Sept. 28, 1976

[54] APPARATUS FOR AFTERBURNING THE EXHAUST GASES OF AN INTERNAL COMBUSTION ENGINE TO REMOVE POLLUTANTS THEREFROM

[76] Inventor: Pierre Alfred Laurent, 62, Avenue Theophile Gautier, 75016 Paris, France

[22] Filed: Feb. 11, 1974

[21] Appl. No.: 441,517

[30] Foreign Application Priority Data
Feb. 12, 1973 France .............................. 73.04925

[52] U.S. Cl. .............................. 60/286; 23/277 C; 60/290; 60/303; 60/306
[51] Int. Cl.² ...................... F01N 3/14; F02B 75/10
[58] Field of Search ............. 60/303, 307, 286, 290, 60/306; 23/277 C

[56] References Cited
UNITED STATES PATENTS

| | | | |
|---|---|---|---|
| 1,839,880 | 1/1932 | Hyatt | 60/303 |
| 2,829,731 | 4/1958 | Clayton | 60/286 |
| 3,066,755 | 12/1962 | Diehl | 60/303 |
| 3,166,895 | 1/1965 | Slayter | 60/302 |
| 3,170,280 | 2/1965 | Rees | 60/303 |
| 3,460,916 | 8/1969 | Aronsohn | 60/286 |
| 3,595,015 | 7/1971 | Kretschmer | 60/303 |
| 3,669,630 | 6/1972 | Filatov | 60/303 |
| 3,788,070 | 1/1974 | Camarasa | 60/282 |
| 3,804,597 | 4/1974 | Inoue | 60/286 |
| 3,837,814 | 9/1974 | Tanasawa | 60/286 |

*Primary Examiner*—Douglas Hart
*Attorney, Agent, or Firm*—Haseltine, Lake & Waters

[57] ABSTRACT

An apparatus for afterburning the combustible pollutants from the exhaust gases of an internal combustion engine in a reactor, in which secondary air is introduced. Upstream of the reactor, a chamber in the form of a torus is provided, through which the exhaust gases from a maximum number of cylinders flow before entering the reactor. A first obstacle, acting as a flame holder is disposed inside the torus. The reactor comprises a chamber whose inner surface is approximately a surface of revolution, and mounted inside of which is a second obstacle, acting as flame holder, substantially along the axis of revolution. The second flame holder has a diameter large enough to provide a contact time of 1 to $3 \times 10^{-3}$ seconds of the gas flow in a recirculation zone surrounding the second flame holder, the diameter of the second flame holder being 15 to 40% of the reactor diameter.

23 Claims, 14 Drawing Figures

APPARATUS FOR AFTERBURNING THE EXHAUST GASES OF AN INTERNAL COMBUSTION ENGINE TO REMOVE POLLUTANTS THEREFROM

BACKGROUND a. Field of the Invention

The present invention relates to apparatus and methods for reducing carbon monoxide and unburned hydrocarbons from the exhaust gases of an internal combustion engine.

b. Prior Art

As is known, these toxic pollutants in the exhaust gases must be eliminated as far as possible. They are very abundant when the carburated mixture, drawn in (or sucked) by the engine, is richer in fuel, as when starting a cold engine which is choked. They are also abundant during hot idling of the engine, or during deceleration of the vehicle with very low air intake.

To reduce combustible pollutants (carbon monoxide and hydrocarbons) most prior art processes and apparatus use the injection of air into the exhaust gases, immediately after the exhaust valves, and enable the mixture to remain in a chamber usually called an afterburner reactor, during a period of time sufficient to improve or complete the combustion of unburned components.

The known processes and apparatus exhibit a number of deficiencies, among which include:

Lack of means for quick ignition of the reactor soon after starting up a cold or hot engine.

Excessive internal baffling of the reactor, causing on one hand a delay of the lighting-up, by a heat sink effect, and on the other hand, inducing gases velocities so high that flames are blown—out at high power.

Lack of protection of the flames against the periodic velocities and pressure pulsations of the exhaust gases.

Lack or insufficient amount of bluff-bodies for flame anchoring.

Poor adaptation of the secondary air rate to the variable amount of unburned pollutants, which vary accordingly to the air/fuel ratio (or richness) which is characteristic of the various engine operating conditions.

Such deficiencies are obviously apparent in the DU PONT thermal reactor, as described for instance in Automotive Eng. Feb. 1972 — p. 27, FIG. 3, which is heavily baffled and completely lacks flame holders. They are also apparent, although to a lesser degree, in the "Rapid Action Manifold" (R.A.M.) described by Robert J. LANG in his paper entitled "A well mixed thermal reactor system for automotive emission control" (SAE 71 0608). This system includes flame-holders located immediately at the outlet of the exhaust valves, which provide a rather quick lighting at start-up of the engine. But the corresponding flames are blown-out at high gas throughput and low unburned materials content. As the reactor itself is completely lacking flame-holders and lighting devices, only a very high gas temperature can support combustion, which leads to excessive richness of the fuel mixture sent to the engine intake.

SUMMARY OF THE INVENTION

A first object of the invention is to lower the normal operating temperature of an afterburner reactor to a level compatible with the service life of the available materials at a reasonable cost, and to minimize or eliminate the enrichment of the engine feed, beyond that which is necessary for normal operation of the engine.

Another object of the invention is to achieve an automatic and quick ignition of the reactor during start up as well as after an accidental blow-out.

Still another object of the invention is to protect the flames against the adverse action of velocity and pressure pulsation of the exhaust gases.

Still another object of the invention is to protect the reactor walls against excessive temperatures in the vicinity of the hottest flames, at the last stage of combustion.

Finally, another object of the invention is to automatically control the secondary air injection in the reactor, in proportion to the amount of unburned pollutants for the various operating conditions of the engine.

In order to achieve the above objects, the invention comprises apparatus for after-burning combustible pollutants in the exhaust gases of an internal combustion engine in a reactor, in which secondary air is introduced. The invention contemplates that, upstream of said reactor, a chamber in the form of a torus is provided, through which the exhaust gases from a maximum number of cylinders flow before entering said reactor, and further a first obstacle, acting as flame holder, inside said torus, said reactor comprising a chamber whose inner surface is approximately a surface of revolution around an axis, and inside of which a second obstacle, acting as flame holder, is located substantially along its axis, and has a diameter large enough to provide a contact time of 1 to $3 \times 10^{-3}$ seconds between the gas flow and a recirculation zone anchored to the flame holder, said diameter amounting to 15 to 40% of the reactor diameter.

More specifically, a part of the secondary air is first injected, immediately near the outlet of each exhaust valve, upstream of a cylindro-conical bluff-body acting as a flame holder whose axis is substantially coincident to the exhaust gases flow axis, and whose downstream terminal surface, approximately perpendicular to the axis, has a diameter of about 15 to 40% of the exhaust pipe diameter, the distance between the air injector and said terminal surface being large enough, in order that the mixing of air and gas is completed when the gases flow by said terminal surface.

The gases, being thus preheated, and enriched in combustion precursors enter into a toroidal chamber extending between two coaxial cylinders, provided with a flame holder, inside of which they acquire a rotating velocity several times larger than the axial flow velocity, and where the combustion of the first or pre-injection air is completed.

Before entering the reactor, the gases flow through a straightening device which suppresses almost all of their rotation momentum, dampens part of the pressure and velocity pulsations, and thoroughly mixes them.

In the reactor, the gas flow meets a cylindrico-conical bluff-body acting as flame holder, mounted approximately coaxially with respect to the reactor, and the back face of which, perpendicular to the common axis, has a diameter of about 15 to 40% of the reactor diameter. The balance of the secondary air is injected ahead of the bluff-body, the distance between the air injector and said back face being great enough so that mixing of the air and gases is completed when the gases flow by said back face.

The secondary air is strongly preheated during startup by means of an electric heater and/or the mixture is lighted inside of the recirculation zones downstream of the reactor flame holder, by means of an electrical resistance, the electric current to the heater and/or resistance being controlled by the starter and/or the choke. The electric current may also be triggered by a thermocouple, in case of accidental blow-out of the reactor.

The bluff-bodies are hollow and the injection air flows inside them so as to control their temperature, and in the case of the reactor flame holder, to cool the junction of the lighting electric resistance with its back face, the electrical feeder itself being connected to the air pipe, in order to control its temperature.

As the flame holders are substantially disturbed by gas velocity pulsations, they are preferably located near pressure variation nodes and not near a velocity variation node, i.e. in the vicinity of the heads of the resonating chambers (which are long cylinders or cones) and not near the middle of such chambers. The reactor flame holder is placed as close as possible to the inlet head of the reactor.

The above protection against pulsations can be improved by the addition of another resonating chamber, connected in parallel, and not in series, to the reactor inlet.

The potential energy of the secondary air can be used in order to produce high energy ultrasonic standing waves, in the vicinity of the injection, and in such an eventuality of stability of the sonic emission is increased by using sonic generators of the stem-jet type, i.e. generators which include a rod or stem: inside of the nozzle, coaxial thereto and incorporated with the resonator. Such generators are commercially available from DEMISTER a.b. Malmo (Sweden).

The outside wall of the torus can be protected against over-heating by providing a double wall therearound and by feeding, between the walls, 5 to 15% of the exhaust gas from the exhaust manifold, which are further injected into the reactor downstream of the central flame, or recycled into the engine inlet, during start-up with or without the choke.

The reactor wall is protected against overheating in the vicinity of the central flame and downstream thereof, by providing a double wall around the reactor, and by letting fresh air flow between the two walls, a part of which diffuses through orifices or by porosity of the reactor wall, in order to form a boundary layer enriched in air, and able to protect the reactor wall against excessive temperature and again corrosion from the gases and especially the decomposition products of tetraethyl lead.

A system is provided according to the invention, for distributing and controlling the secondary air injection, in order to automatically proportion the injection to the amount of unburned components, and particularly to progressively cut the air injection rate, when the power delivered by the engine increases.

DETAILED DESCRIPTION

Figure 1:
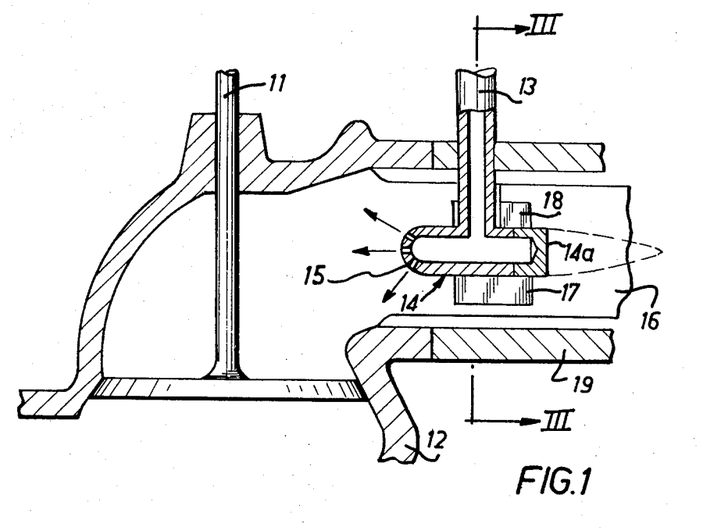
FIG. 1 is a sectional view of the exhaust system of an engine cylinder, showing the position of injectors for secondary air pre-injection, the injector comprising nozzles of a "stem-jet" type sonic generator.
Figure 3:
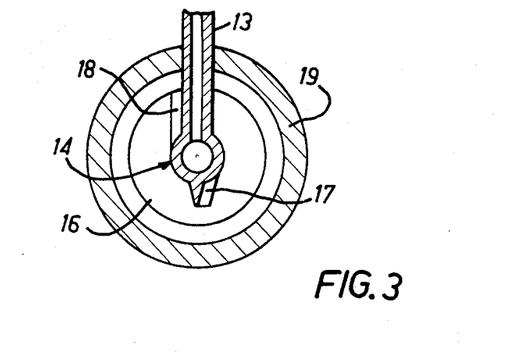
FIG. 3 is a sectional view taken along line III—III in FIG. 1.

Referring to FIGS. 1 and 3, therein is shown an engine cylinder 12 and an exhaust valve 11, and pre-injection secondary air is injected into exhaust pipe 19 through conduit 13 feeding an injector consisting of a hollow bluff-body 14 with a back face 14a and a plurality of nozzles 15 on its front face. The distance between the nozzles 15 and the back face 14a of the bluff-body is greater than the diameter of the exhaust pipe 19. A helicoidal vane 17 is fixed to the bluff-body 14 and a helicoidal vane 18 is fixed to the pipe 13 to streamline its profile and impart a small swirling motion to the gas stream, which improves the stability of a recirculation zone downstream of the bluff-body, thus improving mixing of the air and gas through centrifugation of cold air towards the periphery.

It must be mentioned that a flame is formed at the back force 14a of the bluff-body (shown in dotted outline) which flickers and emanates from the bluff-body only for a rich mixture and at low engine power, the system described by FIG. 1 helping to increase the engine power at which bluff-out appears.

Also, in order to cut thermal loss to the ambient environment, a sleeve 16 is preferably provided in pipe 19.

Figure 2:
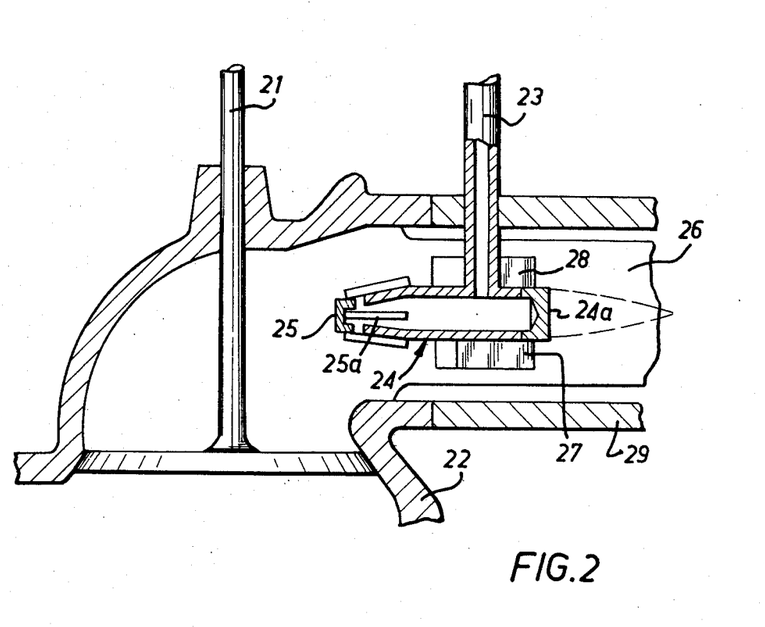
FIG. 2 is a sectional view similar to FIG. 1 showing a modified embodiment.

The device shown in FIG. 2 is similar in principle to that in FIG. 1. The same elements are designated in FIG. 2 as follows: cylinder 22, exhaust valve 21, air line 23, exhaust pipe 29, nozzle 24, back face 24a of the bluff-body and helicoidal vanes 27 and 28. The only difference in the system of FIG. 2 consists in the use of a stem-jet nozzle 25 including stem 25a, instead of simple nozzles 15 as in FIG. 1.

Figure 4:
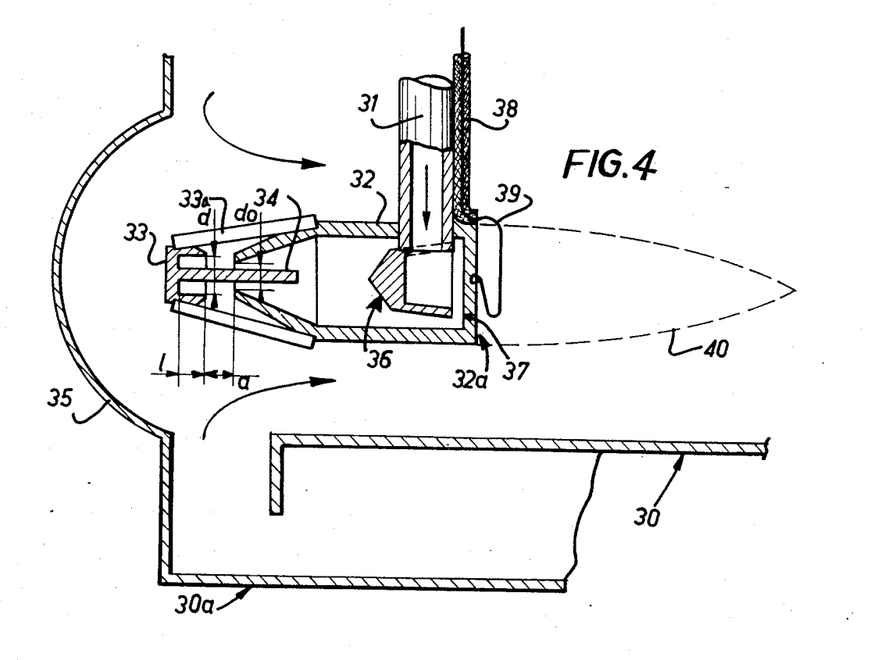
FIG. 4 is a partial sectional view, of a larger stem-jet placed in the center of a reactor, ahead of a bluff-body.

Referring to FIG. 4, the exhaust gases are admitted into a reactor 30 through torus 30a where the exhaust gases are mixed by centrifugation. The secondary air is supplied by a line 31, which feeds an injector-resonator comprising a hollow bluff-body 32, whose back face 32a serves as a flame base or holder, and a stem-jet type resonator 33 with stem 34. In order to ignite the reactor with a hot spot, an electrical resistance 39 is located downstream of the flame holder and very close thereto at a distance of 1 to 5 mm in the most sheltered part of the recirculation zone. One end of the resistance 39 is welded to the back face 32a, used as a ground conductor, and the other is connected to an electrical feeder 38, provided with a ceramic insulation and disposed in a metallic refractory protecting tube. The protecting tube of feeder 38 is in close metallic contact with the air line 31, which cools the tube and enables it to withstand corrosion from hot gases.

The distance between the resonator 33 and the back face 32a of the bluff-body is comparatively great and approximately equal to 2.5 times the diameter of the back face 32a. This distance can be reduced according to the diffusion speed of air in gas, which itself is increased by ultrasonic waves. The reasonator 33 is approximately located at the focus of a parabolic reflector 35, coaxially disposed with respect to the resonator and reactor.

The distance of travel of the air and gas mixture is sufficient, in the presence of sonic waves, to achieve diffusion before reaching the recirculation zone, around which the parabolic reflector can supply sufficient sonic wave energy.

The sonic generator, of the stem-jet or equivalent type, is constructed such that the diameter of the rod 34 is between about one-third and one-quarter of the nozzle diameter do, and the diameter $d$ of the resonator is approximately equal to 1.1 to 1.3 $d$. $o$. The distance $a$ between the nozzle and the injector is approximately equal to a value between 1 and 1.5 $d$; and the depth 1 of the resonator is preferably smaller than $d$.

The secondary air fed by the pipe 31 into the injector is directed towards the bottom 37 thereof through an auxiliary thimble 36 having a rim which forms a gap with the bottom 37 to provide a local air velocity of the order of 100 m/s, in order to achieve a sufficient cooling of the back face 32a, and the end of the resistance 39.

The stem 34 can be fixed in the resonator 33, and in such eventuality the resonator is fastened to the injector and bluff-body by thick legs 33a which can improve the mixing of the air-gas mixture and avoid excess air around the recirculating zone.

Figure 5:
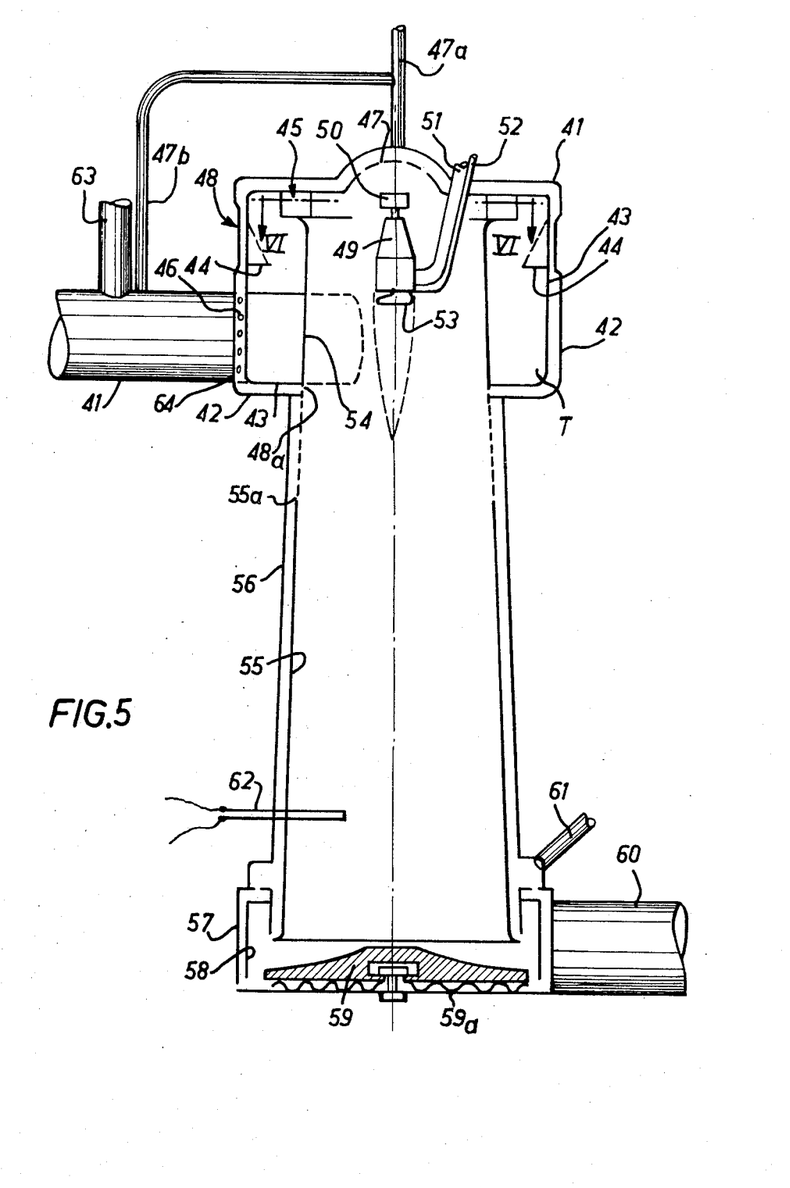
FIG. 5 is a sectional view of an afterburner, according to the present invention, showing a homogenizing inlet torus and a spiral outlet casing.
Figure 6:
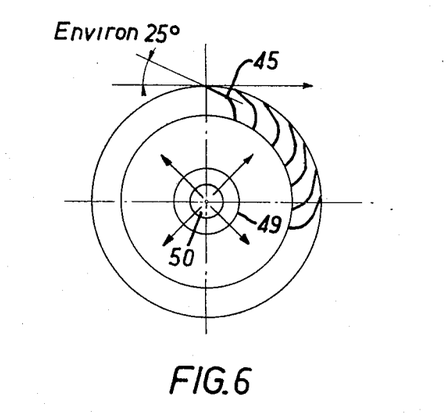
FIG. 6 is a schematic fragmentary view of a section in the reactor taken along line VI—VI in FIG. 5.

FIG. 5 shows a complete afterburner a part of which is represented in FIG. 6, and this afterburner, will be now described in detail.

The exhaust gases are admitted into the reactor from the inlet nozzle 41 into a double wall toroidal shell or torus, having an outer wall 42 and an inner wall 43, the space between the two walls communicating with inlet nozzle 41 through orifices 46 provided at the intersection of the nozzle 41 with the two walls. The inner wall 43 is much thinner than the outside wall so that its heat sink effect is much smaller, and the cooling of the gases during start-up is thus reduced.

The fraction of the gases which flows from the orifices 46 and is withdrawn from the main flow is approximately 10%. The major fraction (about 90%) of the gases flows into the torus, where it acquires a high rotational speed, its axial velocity being several times smaller, of the order of 15 to 20 m/s. The gas stream further strikes an annular dam 44, about 10 mm high, which creates behind this dam a recirculation zone with a length of about 30 mm, along the axis, which helps to anchor a first flame, on account of the centrifugal effect, causing segregation between hot and cold gases.

The gases flow further into the reactor nozzle 54, through a distributor consisting of an annular grid of straightening vanes and represented in detail in FIG. 6.

The height of the vanes corresponds to a radial gas velocity of 30 m/s approximately. The vanes suppress almost all of the rotational momentum of the gas flow around the axis of the reactor, up to a small amount sufficient to avoid an excessive length of the recirculation zone, but without enabling the flame to impinge against the walls of the reactor nozzle 54. Such residual gyratory momentum also helps to centrifuge cold air and improves its mixing with gases.

The gas stream coming from the orifices 46, flows between the walls 42 and 43, and is cooled by the external thermal losses, especially during start-up. A small portion of this stream is directed into the center of the reactor through orifices 47, in the parabolic reflector head, and a major portion is sent to the reactor, through orifices 48a, downstream of the central flame zone, or it can be recycled to the intake manifold during start-up.

The disposal of the major part of these cooled gases, either downstream of the flame through orifices 48a, or into the intake manifold, provides the highest possible temperature at the axial injector and around the central bluff-body. This system helps to ignite and stabilize a central flame during start-up.

The annular space between walls 42 and 43 is restricted in zone 48, which is close to the annular dam 44, and the velocity of the cold gases in zone 48 can reach 60 m/s, thus protecting the inner wall 43 against local overheating by the flame anchored in 44.

A sonic injector-resonator (or whistle) 49,50, supplied with secondary air through line 51, and supported thereby, is located along the axis of the nozzle 54, as close as possible to the head of the torus with its parabolic reflector, in such a position as to place the resonator 50 in the plane of the radial flow from the straightening vanes 45, the length of the integrated nozzle and bluff-body being great enough to place the back face of the bluff-body in a zone where the gases and secondary air are sufficiently mixed, i.e. this length being equal at least to 0.5 times the diameter of nozzle 54.

An ignition electrical resistance 53 is provided on the back face of the flame holder, and is supplied with power by cable 52 supported by the line 51, and provided with ceramic insulation and disposed inside a metallic refractory tubing.

In order to avoid the condition, when the power of the engine exceeds 50% of its maximum, that the air pump pressure becomes excessive, a fraction of the secondary air by-passes the sonic injectors and is fed directly into the reactor through line 47a and the orifices 47. This fraction can vary from 5 to 60% of the secondary air at between 50% and 100% of maximum engine power.

The nozzle 54 is extended by a conical divergent portion consisting of two concentric shells 55 and 56, between which cooling air is supplied. The inner shell 55 is porous or drilled with small holes 55a (of which only a fraction has been represented) in order to build up a cooler air boundary layer inside of the divergent portion.

The remainder of the reactor represented in FIG. 5 includes a spiral outlet casing 57, with an inner shell 58, and a refractory shield 59 connected with the exhaust pipe 60. The space between the spiral casing 57 and its shell 58 is supplied with cooling air through line 61 in order to protect the inner shell 58. The shield 59 is clamped against a flexible support 59a. A thermocouple 62 is advantageously placed in the reactor in order to measure gas temperatures and eventually trigger the ignition of resistance 53, or the air heating by exchange with exhaust gases, in the case of abnormal flame blow-out, as will be explained later. This thermocouple can also cut secondary air injection in the case of reactor overheating.

Figure 7:
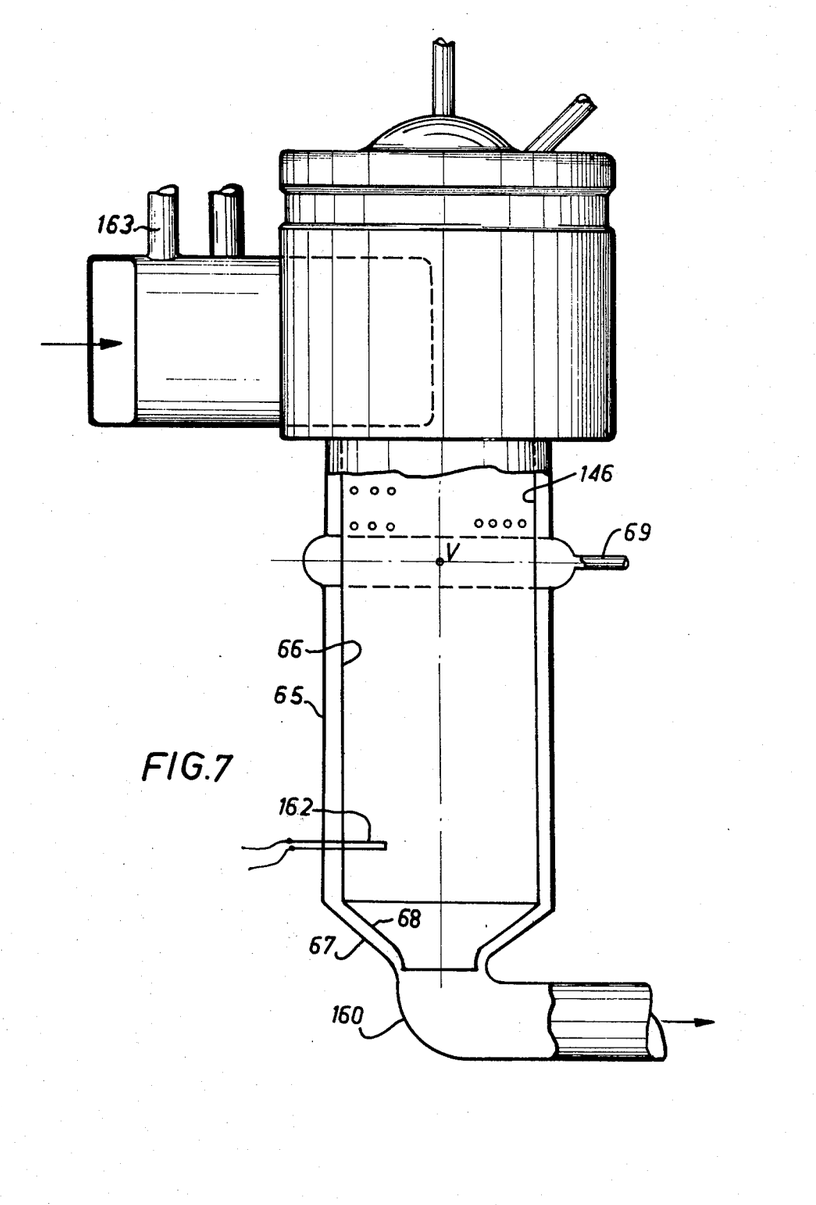
FIG. 7 shows another embodiment of the reactor represented in FIG. 5.

A modified embodiment is represented schematically in FIG. 7 and is similar in principle to the embodiment described hereabove. However, in this modified embodiment, the reactor outer shell 65 and inner shell 66 are cylindrical, the latter being cooled by air supplied through line 69. The ar stream in line 69 also supplies fresh air to a porous inner shell 146 in the vicinity of the central flame in the reactor which feeds the protective boundary layer of the shell 66. The bottom of the reactor is conical and includes an outlet cone 67 connected to the outer shell 65 and the exhaust pipe 160, the cone 67 having a conical inner shell 68. The air velocity between cone 67 and shell 68 is increased, in order to cool this section subjected to hot gases, by means of a sufficient reduction of the gap between cone 67 and shell 68. As in the previous embodiment, a thermocouple 162 is mounted in the reactor.

Thanks to these new constructional improvements, the recirculation zones of the torus and also of the central flame holder are located as close as possible to a zero velocity node, which is at the same time a pressure variation node, determined by the flow and pressure pulsations of the exhaust gases.

Furthermore, the length of the torus, along it axis, and specifically in the embodiment of FIG. 7 increases the recovery of heat from the central flame, which increases the temperature of the gases in the torus, particularly due to the increased heat exchange between the gases and the shell 54, this shell itself remaining protected against overheating, by the high tangential velocity of the torus gases, approximately 80 to 100 m/s, and by their relatively low temperature, due to the fact that only one fraction of the secondary air is pre-injected at the exhaust pipe, contrary to most prior art designs. Because the exhaust valves remain open about one-quarter of the time, their individual flow variations do not appreciably overlap one another. Only the pre-injection air throughput is kept constant and this amounts to 8 to 12% of the engine air intake. The flow and pressure of the mixed gases in the torus fluctuate by about ± 30% around an average value. An axial velocity of 20 m/s corresponds for instance to transient velocities of 24 to 14 m/s near velocity nodes (half way between the two reactor heads). High velocities favor flame blow-out, and good protection against this phenomenon is obtained by increasing the reactor length and by placing the torus annular flame, as well as the reactor central flame in the vicinity of the inlet head. The back end of the central flame holder can thus be located within the first quarter of the reactor length, between the inlet head and the middle of the reactor, where velocity fluctuations are a maximum. The recirculation zone itself ends at about two-thirds of the distance between the inlet head and middle of the reactor. The gas velocity pulsations along the recirculation wake are thus reduced to about one-third to one-half of their value in the reactor center, and this improves the anchoring of the flame along the recirculation zone.

The parabolic reflector concentrates sonic waves around the central bluff-body and stabilizes the flame near the recirculation zone and delays blow-out.

For a better understanding of the invention and only as an example, the essential features are outlined hereunder for a reactor designed for afterburning the exhaust gases from four cylinders of an 8 cylinder engine from a Chevrolet Bel-Air, having a displacement of 307 CID, i.e. 5 liters. The reactor is dimensioned for admitting gases from 2.5 liters displacement, which at high output (approximately 3,000 R.P.M.) has a volume of 2,100 liters per min. (measured at engine intake normal conditions; i.e. at 15°C and atmospheric pressure). The corresponding air to fuel ratio (A/F), in weight, is for instance 13.3, and the stoichiometric air injection rate for after burning is about 14% of the air intake. For instance, 5% will be used for pre-injection, and 14% in the reactor, at least 5% excess air being necessary.

The total temperature increase is about 300°C (540°F), 100°C only occurring after pre-injection, and dissipated by thermal losses between the engine and the torus. Thus, the approximate inlet temperature of the gases into the torus is 700°C. Their volume is then equal to:

$$2100 \times 102 \times \frac{700 + 273}{15 + 273} = 7600 \text{ l./min or } 126 \text{ l./sec.}$$

Further on, thanks to supplementary combustion behind the annular dam and to heat exchange between the torus and the reactor, the gas temperature reaches 750°C with a volume of about 140 l./sec. This calculation does not take into account the negligible volume expansion or concentration due to combustion itself, and is only based on the thermal expansion.

Gases are admitted into the torus through two nozzles each having an area of 8 $cm^2$, or one nozzle having an area of 16 $cm^2$, in order to produce a tangential velocity of about 90 m/s. The average diameter of the torus is about 130 mm, the theoretical rotational speed of the gases (without friction losses) being about 12000 r.p.m., which induces a peripheral pressure increase and a turbulence increasing the combustion velocities and improving flame anchoring (behind the annular peripheral flame holder) even with very lean or dilute mixtures and at temperatures of the order of 750°C.

The straightening vanes of the annular grid which direct the gases near the admission reactor head are about 10 mm high and their projected length, along a radius, is about 15 mm, so that the radial velocity of the gases is about 30 m/s at their outlet.

The axial gas velocity near the central injector is about 25 to 30 m/s, which corresponds to a reactor diameter of 77 to 84 mm for a 140 1/s throughput (at 750°C); with the same velocity the reactor diameter at the inlet of the spiral casing, is about 83 to 91 mm (at 900°C).

Under these conditions, with a back end diameter of the bluff-body of 20 to 25 mm, the recirculation wake length can be about 80 mm, and the contact time of the gases along the wake can be about 3 ms.

Similarly, the annular flame holder 44, with a height of about 10 mm creates a recirculation zone at least 30 mm long. With a 70 to 80 mm diameter of the reactor nozzle 54 and a 130 mm average torus diameter, the axial velocity of the gases is about 15 m/s and the contact time of the gases with this recirculation zone is about 2 ms.

The pre-injection and reactor injection air throughput is adjusted so as to realize, in total, excess air in an amount over stoichiometric of 5 to 10% of the engine air intake, the quenching effect of this excess air being more than compensated by the reaction velocity increase due to higher oxygen concentration at the end of combustion.

The exhaust pulsations cause limited velocity fluctuations near the annular flame holder 44 and the central injector 49, but pressure variations are about ± 30% of the mean pressure. Their effect on the annular flame holder is negigible, but it must be minimized on the sonic reactor injector, which justifies the use of stem-jet nozzles, which are less sensitive to pressure variations than other types.

On the other hand, since the throughput through an orifice does not depend on the outlet pressure when the expansion ratio is equal to or greater than a sonic value of 1.893, it is preferable that the absolute inlet pressure in the injector nozzles is 1.893 times the maximum absolute pressure occurring in the reactor or near the exhaust ports. The mean pressure being equal to one atmosphere plus the reactor and muffler back pressure (about 0.150 bars at full power) the minimum inlet absolute pressure must preferably be:

$$1.150 \times 1.30 \times 1.893 = 2.80 \text{ bars (1.80 bars effective)}$$

At low power, the back pressure is negligible and the minimum inlet pressure can be reduced to 2.45 bars (absolute).

Concerning the ignition resistance 53 behind the injector 49, it must be activated during engine start-up (cold or hot), but, furthermore, it must be used in the case of abnormal reactor blow-out during power or air/fuel ratio, or by the effect of abnormal resonating conditions in the reactor. This can be achieved automatically, when the exhaust temperature at the thermocouple 62 becomes lower than 750° to 780°C.

An alternate solution enabling reduction in the electrical demand and providing a higher air preheat consists in heating the injection air by exchange with exhaust gases. The exchange can be effected in an exchanger between the reactor and the muffler, at such point where the temperature does not exceed the maximum compatible with the desirable durability of the exchanger. The exchanger can be made of a simple stainless steel coil tubing encased inside of the exhaust piping or the muffler.

The air preheat, through electricity or heat exchange, is cut off when the thermocouple 62 temperature exceeds 1500° to 1550°F (815° to 843°C).

In addition to the use of both a sonic injector-flame holder with a parabolic reflector, and an ignition resistance controlled by the reactor exhaust temperature, a further protection against the effects of pressure and velocity pulsations can be achieved through the use of a system for damping the most dangerous pulsations, whose vibrating frequency can be experimentally determined for a given system of reactor and exhaust pipe muffler.

It has been experimentally established that such dampers are effective and enable anchoring a stable flame, but their heat sink effect during start-up is prohibitive. This drawback can be minimized through the use of the ignition resistance and of the sonic wave beam but thermal losses would be excessive, hence it is preferred, according to the present invention, to achieve in case of necessity the damping of dangerous resonance frequencies by means of a chamber placed in derivation on the gas flow and connected with a vibrating system through one or more orifices or pipes of appropriate acoustic impedance. One can thus use a damper or muffler, or the "Volume Resonator Muffler" type as described by L. L. Beranek (Noise and Vibration Control, Mc Graw Hill, Pages 370-376); this equipment can help to reduce the dimensions of the conventional muffler. Such a dampening system has no appreciable thermal inertia and does not absorb heat, because there is no gas flow through it. It can be divided into smaller elements, in order to facilitate its location under an automobile hood, and it can be connected with the inlet nozzles 41 through one or two lines 63 (FIG. 5) or 163 (FIG. 7).

As mentioned previously, it is necessary to inject 5 to 10% excess air above the stoichiometric ratio in order to achieve a quick and complete combustion of combustible pollutants. On the other hand, the stoichiometric ratios increase when the A/F ratio decreases. The following table shows examples of the necessary air injection rates according to various engine operating conditions:

| | | | | Reactor injection | | |
| --- | --- | --- | --- | --- | --- | --- |
| | A/F | Stoichiometric | Pre-injection | constant section orifices | variable section orifices | Total injection ahead of central flame holder |
| Start-up on choke at 1200 rpm | 11.3 | 36 | 15 | 30 | 0 | 45 |
| Hot idle at 800 rpm | 12 | 26 | 12 | 24 | 0 | 36 |
| 50% power at 2000 to 3000 rpm with moderate intake vacuum | 13.3 | 14 | 5 | 10 | 3 | 18 |
| 100 % power w.o.t. 3200 rpm with low intake vacuum | 13.7 or 14 | 11 8 | 2 2 | 4 4 | 10 6 | 16 12 |

Secondary air rates (in % of engine air intake)

It appears that, in the present example, the secondary air rate at full power can be as low as 1/3 of the hot idle rate.

On the other hand, under hot idling conditions, and despite the appreciable power demand of the air pump, the engine air intake is 8 to 9 times smaller than at full power and high r.p.m., with low intake vacuum. Although the air pump throughput is only multiplied by 3 or 4 from hot idle to full power, its absolute delivery pressure would be multiplied by the same amount, should the pump throughout be injected only through constant section sonic orifices, and it would reach for instance:

$2.45 \times 4 = 9.80$ bars (abs) (or 130 psig)

The power consumption of the pump would then be too high, the sonic energy excessive, and the sonic noise might be objectionable, despite the reactor acoustic insulation. Therefore, the present invention contemplates a limit on the air pressure to a value corresponding to the necessary sonic energy production.

As an example, the effect of this limitation to 3 bars eff. (44 psig) is explained hereunder. The sonic orifice throughput would be, accordingly, at full power limited to $(4/9.80)$, $= 40.8\%$ of the total secondary air throughput, which would be however: $(400/2.45) = 1.63$ times the hot idle sonic orifice throughput. It is thus preferred to deliver at full power up to 60% of the secondary air through variable section orifices into the reactor inlet.

Figure 8:
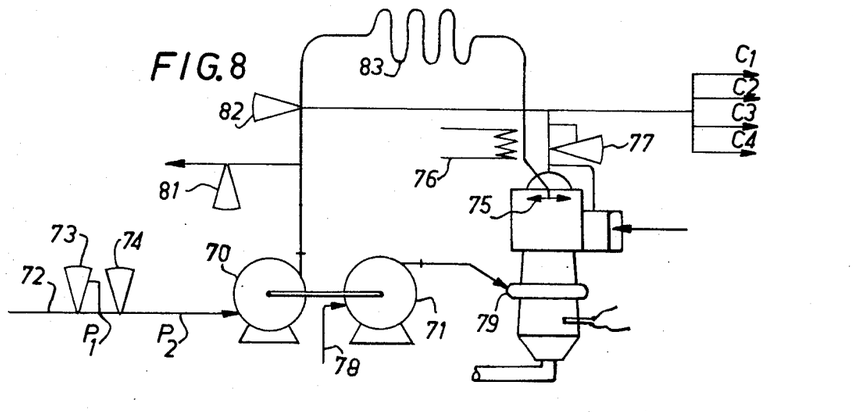
FIG. 8 is a schematic flow diagram showing the secondary air distribution for a four cylinder engine equipped with an afterburner according to the invention.

Referring to FIG. 8, one embodiment of the air supply and control system, which satisfies the above conditions, is described as follows:

The volumetric air pump 70, positively driven by the engine, takes atmospheric air from line 72, through a control valve 73, which restricts the air flow so as to reduce the absolute pressure P1, downstream of this valve, at about the absolute pressure of the engine intake manifold, this valve remaining however wide open during start-up or idling.

Furthermore, it is necessary that the secondary air rate decreases when the engine air intake increases. As this air flow is approximately measured by the suction pressure at the carburator venturi, at atmospheric pressure, it is a further object of the present invention to reduce once more the suction pressure of the air pump with a second control valve, actuated by the venturi suction, in order that the pump throughput, for full power of the engine, is about 3 to 4 times its hot idling throughput.

The secondary air distribution and control system represented in FIG. 8 is based on the above principles. Namely, the high pressure air is sent to sonic injectors C1, C2, C3, C4 and to the reactor central sonic injector 75, for which the air can be preheated by the electrical resistance 76.

When the air inlet pressure reaches a limit of about 4 bars absolute (or 44 psig) the pressure control valve 77 opens and directs the excess air into the reactor inlet. For instance, referring to FIG. 5 one fraction of this air will be supplied through line 47a and flow only through orifices 47, on account of the restricted annular section 48, and the remainder will be supplied to the inlet of the torus through line 47b. Referring again to FIG. 8, the safety relief valve 81 opens, and sends air into the engine intake in case of abnormal overheating of the reactor (for instance spark plug misfiring). It can also be opened to deliver air into the engine intake during acceleration at high speed.

A three-way valve 82 withdraws high pressure air toward exhaust gas heat exchanger 83, when the thermocouple 62 temperature is lower than the temperature corresponding to the central flame blow-out (approximately 750°C). The exchanger 83 is located between the reactor outlet and the muffler. It can even be incorporated in the muffler inlet, at a place where the durability of the coil is satisfactory, when the air flow is cut. The air preheat through exhaust gases is terminated when the temperature at the thermocouple returns to normal, i.e. 815° to 850°C (1500° to 1550°F).

The cooling air inside of the double wall of the reactor is supplied by a blower 71, positively driven by the engine, and having a suction inlet connected to the atmosphere via line 78, the blower 71 delivering air to the reactor into the torus 79. Its delivery pressure is approximately 0.3 bar at idling and 0.5 bar at full power, and the orifices and/or the porosity of the inner walls are dimensioned accordingly.

The valve 73 controls pressure P1 according to intake manifold vacuum and valve 74 reduces it to a lower value P2 according to the carburator venturi suction.

Figure 9A:
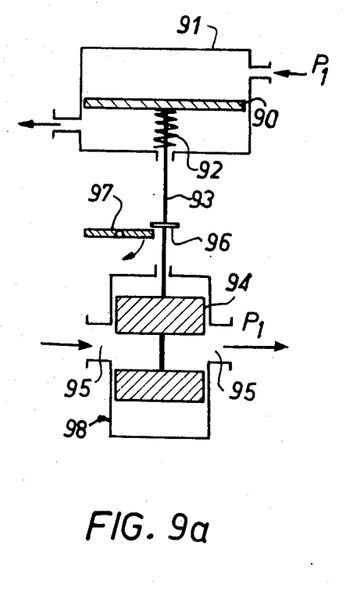
FIGS. 9a and 9b are schematic sectional views of two types of control valves which can be used for realizing an air distribution and control system according to the present invention.

Referring to FIG. 9a, therein is disclosed a constructive embodiment of the control valves. The valve 98 comprises an actuating piston 90, which moves inside of a cylinder 91, and entrains through a connecting rod 93 a balanced plane or cylindrical sleeve valve 94. This sleeve valve travels in front of the slots 95 of the valve body. One side of the piston is connected with the engine intake manifold and the other with the pressure P1 after the valve, and the piston moves itself until the pressure balance between its two sides is achieved. It is possible to modify this balance to some extent, if necessary, by means of the spring 92.

On the rod 93, is fastened a thrust collar 96 which can be lifted through a mobile lever 97, which is controlled by the choke mechanism and which yields when the choke is cut-off. This device enables setting pressure P1 at a higher value than the intake manifold pressure during this period.

Figure 9B:
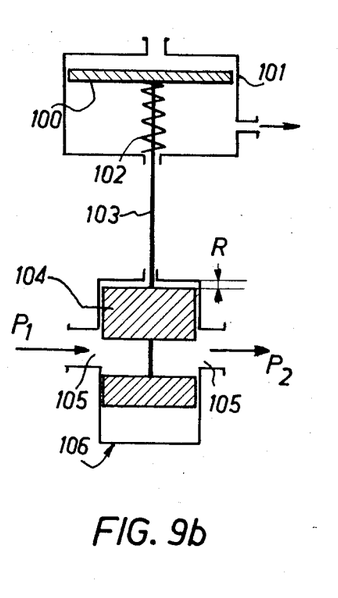

With reference to FIG. 9b, the second pressure reducing valve consists of an actuating piston 100 movable inside cylinder 101 against a spring 102. The piston 100 entrains through connecting rod 103 a balance sleeve valve 104 (plane or cylindrical) which travels in front of the slots 105 of the valve body, in order that the gap R between the sleeve valve and the valve body 106, towards the side of the variable pressure, is equal to the overlap between the sleeve valves and the valve slots. One side of the actuating piston 100 is connected to receive the pressure at the throat of the carburetor venturi, and the other side is subjected to atmospheric pressure.

As the vacuum action on the piston is approximately proportional to the power 2 of the engine air intake its displacement varies accordingly if the spring 102 is sufficiently flexible, and its length reduction is proportional to the applied thrust. If the slots 105 were rectangular, the free air section would thus be inversely proportional to the engine air intake by the power 2, which would reduce the back pressure P2 more rapidly than the air intake, and thereby achieve a certain reduction of the secondary air injection rate, according to the power delivered by the engine.

Figure 10A:
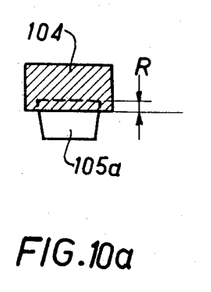
FIGS. 10a and 10b are detailed views of modifications of the control valves of FIG. 9b.
Figure 10B:
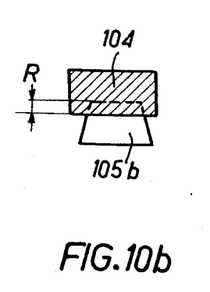

In order to realize the rates listed in the above table, it is necessary to shape the slits 105 (inlet and outlet) with a trapezoidal shape, which provides a means to achieve an appropriate differential correction of the free section, according to either shape of the trapezoid 105a or 105b as is represented in FIG. 10a and 10b.

Figure 11:
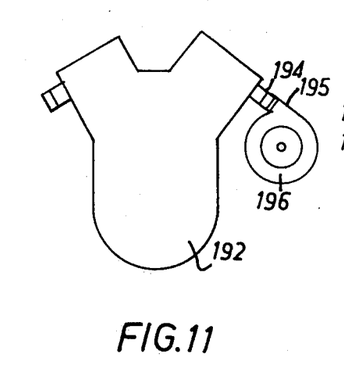
FIGS. 11 and 12 are respective front and side views of an engine, schematically showing the location of its afterburner in accordance with the present.
Figure 12:
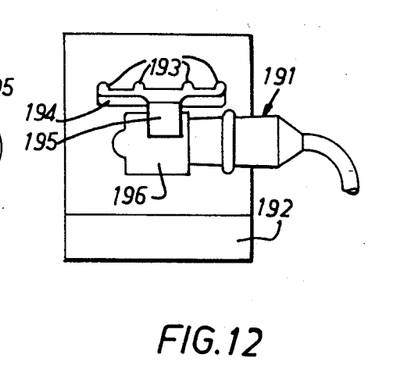

FIGS. 11 and 12 are schematic illustrations showing how the reactor 191 of the invention can be arranged along one side of the engine 192. The gases coming out of the exhaust outlets 193 are collected by manifold 194, which is connected to the nozzle 195, which itself injects the gases tangentially into the torus 196. One advantage of this arrangement is to minimize differential expansion between the nozzle and the exhaust manifold.

What is claimed is:

1. An apparatus for after-burning combustible pollutants in the exhaust gases of an internal combustion engine, said apparatus comprising a reactor for burning the exhaust gases, means for introducing secondary air into the reactor, a toroidal body disposed upstream of said reactor for receiving the exhaust gases from the engine and imparting high rotational speed thereto before introduction of exhaust gases into said reactor, distributor means for introducing the exhaust gases into said reactor from said toroidal body with substantial suppression of the rotational momentum of the gases, a first obstacle serving as a flame holder mounted inside said toroidal body and having an annular face at which a first flame is produced, said reactor comprising a body having an inner surface which is approximately a surface of revolution around an axis, and a second obstacle disposed within said inner surface substantially along said axis and serving as a second flame holder at which a second flame is produced with a surrounding gas recirculation zone, said second obstacle having a diameter between 15 and 40% of the diameter of the reactor to provide a contact time of 1 to $3 \times 10^{-3}$ seconds of the gas flow in the said recirculation zone.

2. An apparatus as claimed in claim 1 comprising a first injector means for injecting a part of the secondary air into the exhaust gases of the engine, in the immediate vicinity of the exhaust conduit of each cylinder, and a second injector means for injecting the remaining secondary air into said reactor downstream of said second flame holder, in order to control the temperature inside of said torus.

3. An apparatus as claimed in claim 2, in which said first injector means comprises a hollow cylindro-conical bluff-body having an axis coincident with the axis of a corresponding exhaust pipe of the associated cylinder.

4. An apparatus as claimed in claim 2 in which said first injector means comprises a cylindro-conical bluff-body having an axis coincident with the axis of a pipe of the associated cylinder, said bluff-body having a downstream surface which is approximately planar and perpendicular to said axis with a diameter amounting to 15 to 40% of the diameter of the corresponding exhaust pipe.

5. An apparatus as claimed in claim 1 comprising means for generating a field of ultrasonic standing waves which extends in close vicinity to at least one of the means for secondary air injection.

6. An apparatus as claimed in claim 5, wherein said means for generating ultra-sonic standing waves comprises a nozzle of stem-jet type.

7. An apparatus as claimed in claim 1, in which said toroidal body includes admission nozzle means for the gases to cause the gases to enter tangentially into the toroidal body, with a high tangential velocity and a substantially lower axial velocity so that the gases travel inside said toroidal body along a low pitch helicoidal trajectory.

8. An apparatus as claimed in claim 1, wherein said annular face of said first flame holder comprises an annular dam in said toroidal body and occupying only a fraction of the cross section of said toroidal body.

9. An apparatus as claimed in claim 1, wherein said distributor means comprises an annular grid of straightening vanes.

10. An apparatus as claimed in claim 1, in which said toroidal body comprises two spaced shells between which flows a fraction of less than 15% of the exhaust gases from the engine and including means for injecting said fraction of exhaust gases into the reactor, downstream of said second flame holder.

11. An apparatus as claimed in claim 1 wherein said reactor includes, downstream of the second flame holder, two spaced shells approximately coaxial, and means for feeding fresh air between said two shells, the inner shell being partially permeable to said air to feed a boundary layer of air protecting said inner shell against local overheating and corrosion.

12. An apparatus as claimed in claim 11, wherein said means for feeding fresh air includes a secondary air pump, a blower linked to the secondary air pump, said blower supplying said air under a pressure of less than 0.5 bars (effective).

13. An apparatus as claimed in claim 3, wherein said first injection means includes vanes for imparting a helical trajectory to the gases inside the exhaust pipes.

14. An apparatus as claimed in claim 1, comprising a heatable wire mounted on the second flame holder for preheating at least a fraction of the secondary air during engine starting.

15. An apparatus as claimed in claim 5, comprising legs connecting said means for generating the ultrasonic waves and the means for injecting secondary air, said legs having sufficient thickness to provide zones in the gas flow which are sheltered from the injection air flow.

16. An apparatus as claimed in claim 1 comprising a resonating chamber connected upstream of said reactor, in order to dampen velocity and pressure pulsations of the gases.

17. An apparatus as claimed in claim 1 comprising a temperature sensor in said reactor for activating means for controlling temperature inside of the reactor, when said sensor record temperatures outside of a pre-determined range.

18. An apparatus as claimed in claim 12 wherein said pump supplying secondary air is equipped with a valve which restricts air intake to said pump such that the ratio of said pump air output to the engine air intake decreases automatically as said latter air intake increases, said valve being of balanced type, and including a stem rigidly linked to a piston subjected on one side to atmospheric pressure, and on the other side to the pressure at the throat of the carburator venturi, and a spring balancing the resulting force, the spring having a length variation which is approximately proportional to the applied force.

19. An apparatus as claimed in claim 1 wherein said annular face of said first obstacle is concentric with the axis of said toroidal body and extends perpendicular to said axis.

20. An apparatus as claimed in claim 19 wherein said second obstacle is disposed in an axial position radially inwardly of the first obstacle.

21. An apparatus as claimed in claim 20 wherein said toroidal body has an inlet leading into said reactor at a location upstream of the second flame holder.

22. An apparatus as claimed in claim 20 wherein said second obstacle is hollow and has one end facing upstream and an opposite end facing downstream, said one end having outlet means opening into said reactor, said means for introducing secondary air into the reactor including a secondary air conduit connected to said hollow second obstacle for delivering air into said reactor via said outlet means, said opposite end of the second obstacle serving as the flame holder.

23. An apparatus as claimed in claim 22 wherein said opposite end of said second obstacle is flat, said flame being produced at said flat end of the second obstacle.

* * * * *